March 26, 1935.    H. J. DILLON    1,995,501
VEHICLE CAB
Filed July 24, 1933    3 Sheets-Sheet 1
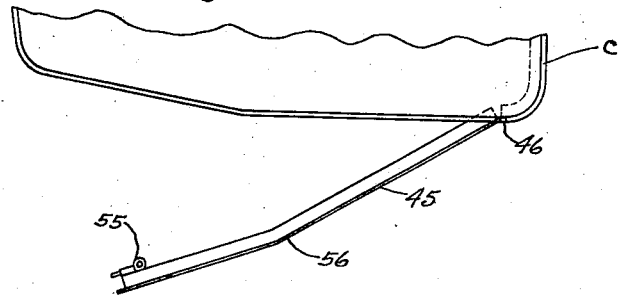
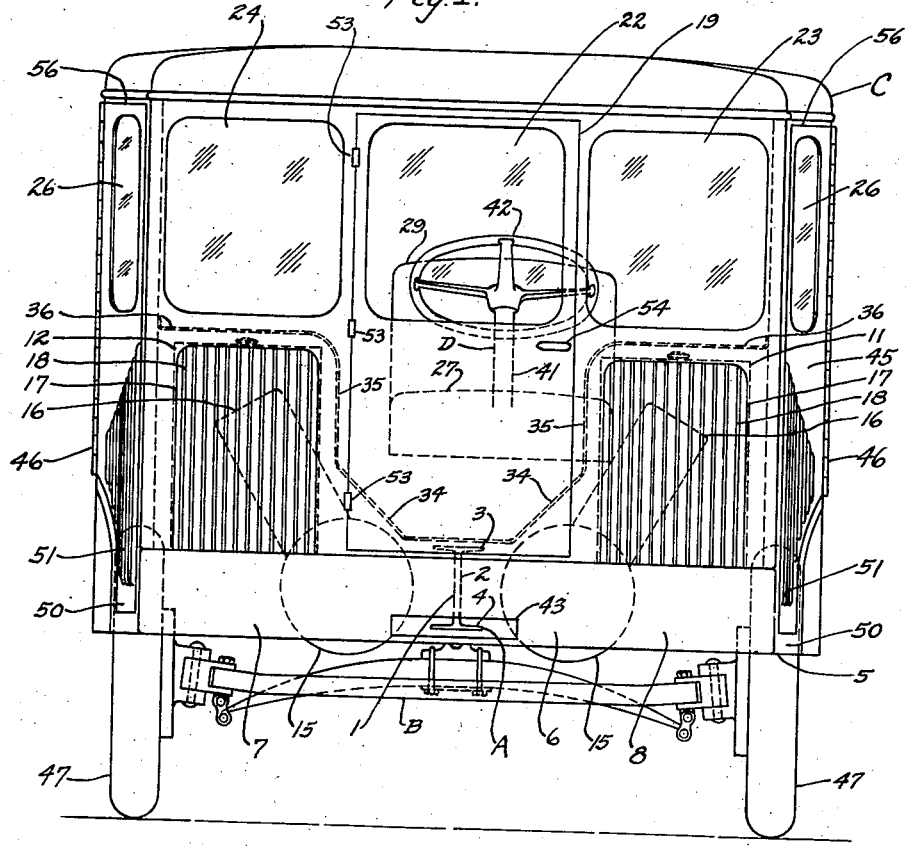
INVENTOR
Hugh Joseph Dillon,
BY George B. Ingersoll
ATTORNEY March 26, 1935.  H. J. DILLON  1,995,501
VEHICLE CAB
Filed July 24, 1933   3 Sheets-Sheet 2
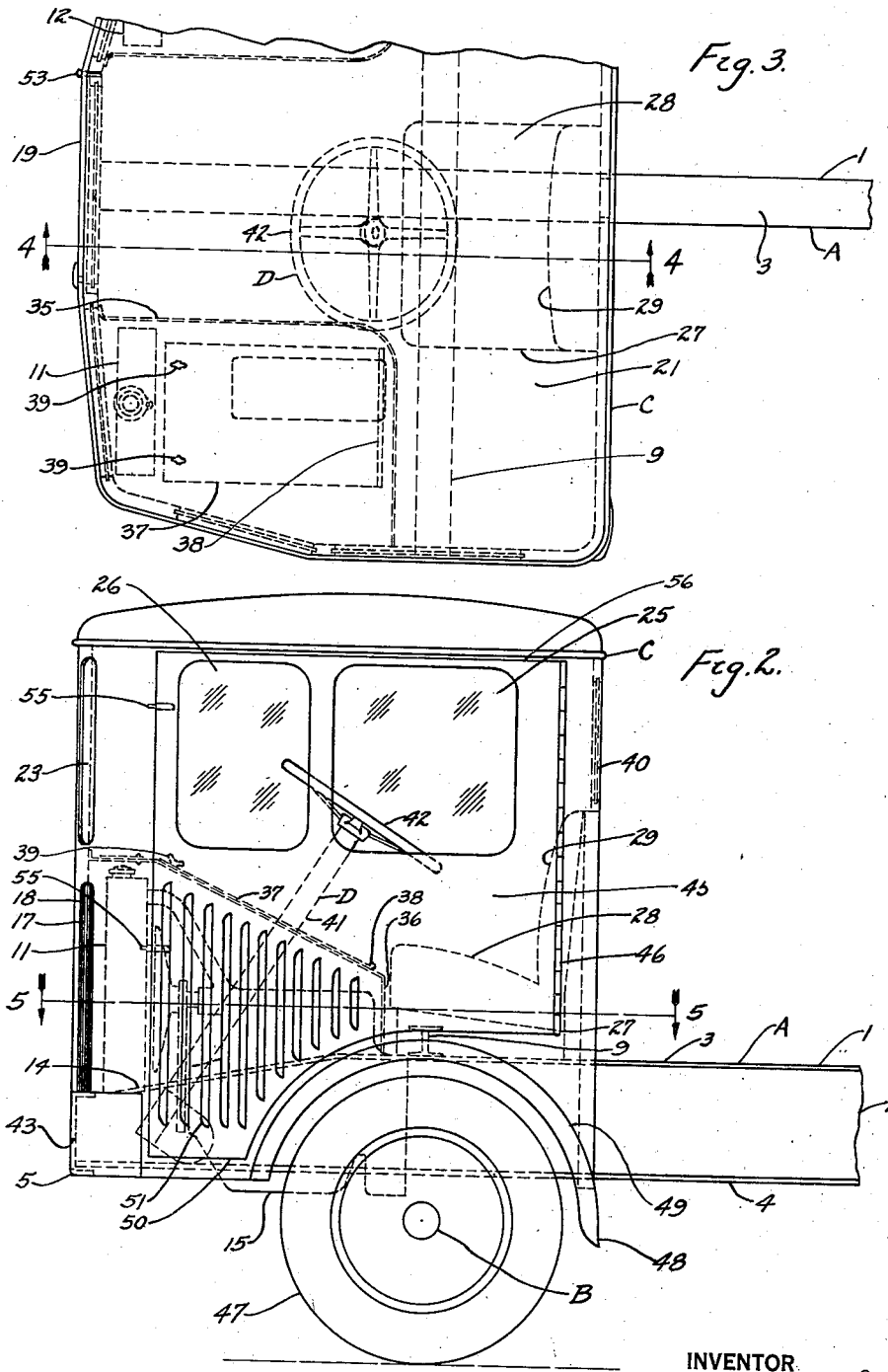
INVENTOR
Hugh Joseph Dillon,
BY
George B. Ingersoll
ATTORNEY

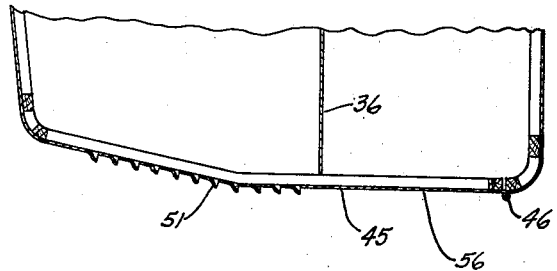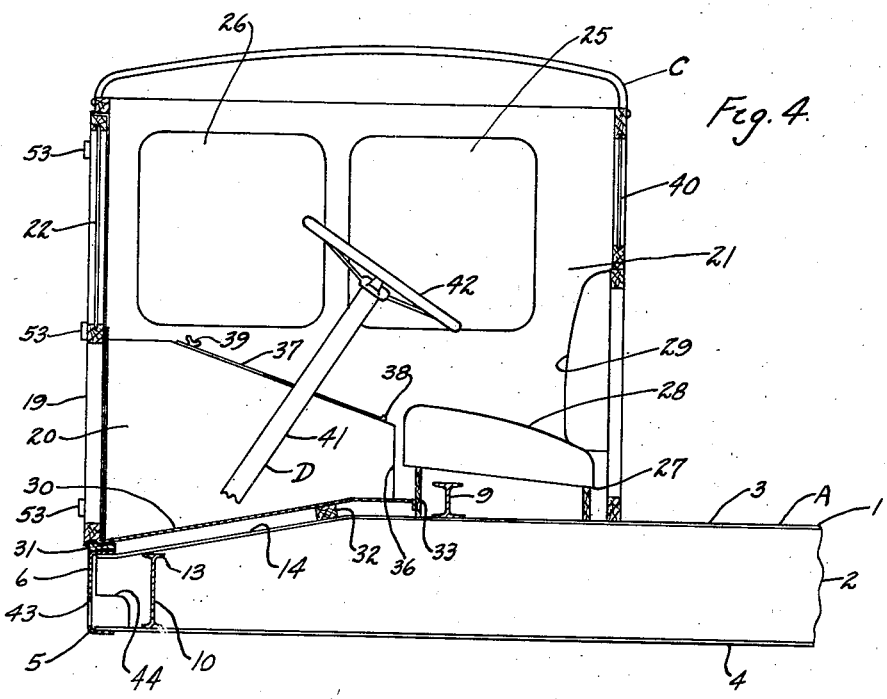

Patented Mar. 26, 1935

1,995,501

UNITED STATES PATENT OFFICE 1,995,501

VEHICLE CAB

Hugh Joseph Dillon, Highland Park, Mich.

Application July 24, 1933, Serial No. 681,850

14 Claims. (Cl. 180—54)

My invention relates to improvements in a cab construction for vehicles and the objects of my improvement are, first, to provide a vehicle cab having an entrance located in its forward side; second, to provide a cab for a vehicle having a pair of engine assemblies; third, to provide a cab having portions at each side of its forward portion for enclosing radiator assemblies; fourth, to provide a vehicle cab having pivotally mounted side panels adapted for use in emergencies; fifth, to provide a cab for a vehicle having a pair of engine assemblies, said cab having a seat portion arranged approximately at the center of a space extending between the pair of engine assemblies; sixth, to provide a cab for vehicles having a pair of engine assemblies, said cab having enclosure members for covering the engine assemblies, the enclosure members being accessible from the driver's seat within the cab; and seventh, to provide a cab for a vehicle having a single main frame member together with a pair of cross frame members for supporting the cab.

I attain these objects by the mechanisms illustrated in the accompanying drawings, in which:

Figure 1 is a front view of the cab mounted on a vehicle; Fig. 2, a side view of the cab mounted on a vehicle; Fig. 3, a plan view of the cab mounted on a vehicle; Fig. 4, a sectional view of the cab taken on the line 4—4, Fig. 3; Fig. 5, a partial sectional view of the cab taken on the line 5—5, Fig. 2; and Fig. 6, a partial plan view of the cab disclosing one of the pivotally mounted side panels in an open position.

Similar numerals refer to similar parts throughout the several views.

My vehicle cab invention is adapted to be mounted at the extreme front end of a vehicle and is disclosed herein as being installed on a vehicle comprising a frame assembly A and an axle assembly B, said frame assembly A as disclosed in the drawings of my invention herewith being similar to the frame assembly as disclosed in and forming a part of my design and construction claimed in the U. S. Patent application, Serial No. 681,851, filed on the 24th day of July, 1933.

The axle assembly B as disclosed in the drawings of my invention herewith is similar to the axle assembly as disclosed in and forming a part of my design and construction claimed in the United States Patent application, Serial No. 681,849, filed on the 24th day of July, 1933.

The frame assembly A comprises the main frame member 1 which extends longitudinally, approximately on the longitudinal center line of the vehicle, the main frame member being provided with the vertical web 2 and the upper and lower horizontal flanges 3 and 4.

The axle assembly B is pivotally connected to the lower flange 4 of the main frame member 1 and comprises the detail parts which are more fully disclosed and enumerated in the above mentioned and separate patent application for a Spring and axle construction for vehicles. The frame member assembly A is further provided with a bumper member 5 which is provided with a straight portion 6 at the central portion of the chassis of the vehicle, the bumper member 5 being further provided with the portions 7 and 8 which together with the portion 6 may be located to follow the general outline of the cab construction, said general outline being disclosed in the plan view, Fig. 3.

The frame assembly A is further provided with the cross member 9 which extends transversely relative to the main frame member 1 and the longitudinal center line of the vehicle. The front cross member 9 further extends approximately outwardly to points adjacent the sides of the cab construction. The frame assembly is also further provided with the frame members 10 which extend on each side of the frame member 1 to connect with the outer edge of the bumper member 5 as more fully disclosed in the above mentioned patent application for vehicle.

The radiator assemblies 11 and 12 may be suitably supported on the upper flange 13 of the frame members 10. The main frame member 1 may have an inclined surface 14 at its extreme forward end, the inclined surface 14 being formed by decreasing the vertical width of the web 2 and by suitably constructing the upper flange 3, forming the surface 14 which extends forwardly to the bumper member 5, so that the extreme forward end of the main frame member 1 may telescope within the bumper member 5.

The engine assemblies which are indicated at 15 are provided with the cylinder portions 16 which are inclined relative to the vertical center of the cab and the vehicle. It is to be noted that the engine assemblies 15 are fully disclosed as to their mounting details in the above mentioned separate patent application, Serial No. 681,851, filed on the 24th day of July, 1933, for Vehicle. The engine assemblies 15 are located on opposite sides of the main frame member 1.

The cab assembly C is designed and adapted to be suitably secured and mounted on the main frame member 1 together with the front cross member 9, the bumper member 5 and the members 10. The cab assembly C will be provided with suitable openings 17 in its forward side adjacent the radiator assemblies 11 and 12, the openings 17 being suitably and partially covered by the grill work 18 to permit a flow of air through the radiator assemblies 11 and 12, and out through the member 51 of the panel members 45 as hereinafter disclosed.

The cab assembly C will be provided with the door 19 which is located approximately on the longitudinal center line of the vehicle and of the cab assembly C, the door 19 being located approximately midway between the radiator assemblies 11 and 12 and also on a vertical line extending between the engine assemblies 15, the door 19 being pivotally mounted on the hinges 53 and further provided with the locking handle 54.

It will thus be noted that the door 19 provides an entrance to the passageway 20 which extends between the engine assemblies 15 rearwardly to the driver's compartment 21. The door 19 will be provided with the window 22 in its upper portion, the window 22 being suitably located so as to be in alignment with the windows 23 and 24 which are constructed in the forward side of the cab assembly C.

The windows 22, 23 and 24, together with the windows 25 and 26 in the sides of the cab assembly C thus provide an exceptional amount of vision for the driver when sitting on the driver's seat 27, which is provided with the conventional seat cushion 28 and back cushion 29. The driver's seat 27 is located approximately at the center line of the cab assembly C and at the end of the passageway 20 so that the driver's feet may extend into the passageway 20.

The passageway 20 may be provided with the ramp 30 which may be suitably supported by the members 31 and 32 in a position slightly above the inclined surface 14 of the main frame member 1, the ramp member 30 extending rearwardly to a point where it will be connected to one of the seat supports 33.

The ramp member 30 may have inclined sides as at 34, the inclined sides 34 being suitably constructed to clear and extend over the sides of the engine assemblies 15, the inclined sides 34 connecting with the vertical portions 35, of the hood structure 36, which covers and extends over the top of the engine assemblies 15, thus forming engine compartments which are separated from the interior of the cab assembly C.

The hood structure 36 may be provided with the cover or door 37 which may be hinged as at 38, said cover or door member 37 being suitably secured by the suitably mounted wing nuts 39 or other suitable locking or fastening means.

It is thus to be noted that access is provided for the driver when in the cab assembly C for adjusting or servicing the engine assemblies 15, the door 37 being easily and readily pivotally moved upward on the hinge member 38 to provide said access to the engine assemblies 15. The cab assembly C is provided with the rear window 40 which may extend for the greater portion of the width of the cab assembly C. The steering gear assembly D may be suitably mounted as disclosed in my above mentioned patent application for Vehicle, Serial No. 681,851, filed by me on the 24th day of July, 1933, and the column 41 of the steering wheel assembly D may extend upwardly in an inclined position through the passageway 20 so that the steering wheel 42 will be adjacent the driver when seated in the driver's seat 27.

In order to facilitate the entrance of the driver through the door 19, the bumper member of the frame assembly A is provided with the opening 43 which is more fully disclosed in the above mentioned patent application for a vehicle, Serial No. 681,851, filed by me on the 24th day of July, 1933, the opening 43 permitting the entrance of the driver's foot therein so that the driver can easily mount from the ground up into the passageway 20, the vertical web 2 of the main frame cross member 1 being provided with the cutaway portion 44 to provide sufficient clearance around the driver's foot while being supported in the opening 43.

To permit the driver, while in the cab assembly C, to leave the cab assembly C without opening or passing through the door 19 as in cases of emergency, the assembly C is provided with side openings 56 which will be closed by the panel structures or members 45, each panel structure 45 being hinged as at 46 for permitting the panel structure 45 to be swung outwardly and rearwardly over the wheels 47 of the axle assembly C as disclosed in Fig. 6. The panel structures 45 are cut away at their rear portions to clear the fender 48 which may be suitably secured to the front cross member 9 and to the wheel house portion 49 of the cab assembly C.

Also the structures 45 may extend downwardly below the extreme upper portion of the fenders 49 at the forward portion of the panel structures or members 45, the lengthened or extended portions 50 of the panel structures 45 being further provided with the louvers 51 which will permit circulation of air from the spaces which contain the engine assemblies 15 and the radiator assemblies 11 and 12. The panel structures 45 may be secured or locked by suitable latching mechanism 55 being located on the inside of the cab assembly C to permit the driver of the vehicle to open the panel members 45 from the inside of the cab assembly C.

It is to be further noted that my vehicle cab will provide a cab construction that is especially adapted for protection of the operator of the vehicle. This is especially valuable when valuable goods are being transported and the operator is exposed to danger such as "hijacking", robbery, etc. When the vehicle is traveling it will be impossible for a party to enter the cab through its front entrance and the side entrances will always be closed with panels which are locked on the inside, and which can only be operated by the operator of the vehicle within the cab.

I claim:

1. In a cab for a vehicle comprising a main frame member, extending longitudinally at the longitudinal center of the vehicle, together with frame members extending transversely thereto, the vehicle further comprising a pair of engine assemblies suitably mounted on opposite sides of the main frame member, the combination of a driver's compartment in the cab, a seat suitably mounted in said driver's compartment, a door suitably mounted at the forward side of the cab, a passage extending from said door to said seat in said driver's compartment, said passage extending longitudinally at the approximate longitudinal center of the cab and the vehicle, hood structures suitably mounted in said cab and covering the engine assemblies, door members suitably mounted in said hood structures, panel members for closing sides of the cab, said panel members being pivotally mounted on the cab, and means for securing said side panel members in their closed positions.

2. In a cab for a vehicle comprising a pair of engine assemblies, a cab suitably mounted on the vehicle and provided with a seat compartment, said cab being located over said pair of engine assemblies, said cab being provided with a passage way extending between said pair of engine assemblies, a portion of said passageway being located above said pair of engine assemblies, said passageway extending only from the front of the cab to the seat compartment of said cab.

3. In a cab for a vehicle comprising a bumper having an opening for receiving the foot of a person, entrance means for the cab, said entrance means being located above the bumper.

4. In a cab for a vehicle comprising a pair of engine assemblies, the combination of a door suitably mounted in the cab, and an inclined ramp in the cab and having its lowest end located adjacent said door, said inclined ramp being provided with side portions, and hood structures covering the engine assemblies, said hood structures being located on opposite sides of said ramp, said hood structures being suitably connected with the side portions of said inclined ramp.

5. In a cab for a vehicle comprising a pair of engine assemblies, the combination of a hood structure for covering the engine assemblies, said hood structure being located in the cab, said hood structure comprising side wall portions together with a floor portion extending between the pair of engine assemblies.

6. In a cab for a vehicle comprising a pair of engine assemblies, the combination of a hood structure for covering the pair of engine assemblies, said hood structure being provided with vertical wall portions adjacent the inner sides of each of said engine assemblies, said hood structure being further provided with inclined wall portions connected with an inclined ramp extending between said engine assemblies said hood structure being located in the cab, and a door member suitably mounted on said hood structure above each of said engine assemblies.

7. In a cab for a vehicle comprising an engine assembly together with a radiator assembly suitably connected with the engine assembly, the combination of a hood structure for covering the engine assembly and said radiator assembly, said hood structure being located in the cab, said hood structure being inclined rearwardly from a point approximately at the rear of said radiator assembly, and a driver's seat suitably mounted rearwardly from said hood structure.

8. In a vehicle comprising a pair of engine assemblies, a cab suitably mounted over the pair of engine assemblies, said cab being provided with a single compartment extending over both of the said engine assemblies, said cab being further provided with an entrance way extending between the pair of engine assemblies.

9. In a vehicle comprising a frame assembly having a main frame member extending longitudinally at the approximate longitudinal center of the vehicle and having an upper surface adjacent its front end located below its remaining upper surface, a cab suitably mounted on the frame assembly, said cab being provided with a door adjacent said upper surface located adjacent the front end of the frame member and below the remaining upper surface of said frame member.

10. In a vehicle comprising a pair of engine assemblies together with a pair of radiator assemblies located at the front end of the vehicle, the combination of a cab provided with compartments for each of said engine assemblies together with a seat compartment, the compartments for each of the engine assemblies extending from the front of said cab for a portion only of the length of said cab, means permitting a flow of air through the radiator assemblies into said compartments, means permitting a flow of air through the outer side walls of said compartments, and a seat suitably mounted in the seat compartment of said cab and located in a vertical plane extending between the pair of engine assemblies.

11. In a cab for a vehicle, the combination of a panel member for closing a portion of one of the sides of the cab, said panel member being provided with means to permit its ready removal from its closed position, a door member suitably mounted at the front of the cab, and a driver's compartment located at the rear of the cab and extending transversely through the width of the cab to a point adjacent said panel member, a passage connecting with said driver's compartment and extending to a point adjacent said door, said passage being located on the longitudinal center of said cab and said vehicle.

12. In a cab for a vehicle comprising a wheel fender together with a pair of engine assemblies, a panel member suitably mounted adjacent and over the wheel fender, said panel member extending forwardly from and below the top of the wheel fender, at its forward side, means for pivotally mounting said panel member so that it may be moved from its closed position, and a seat compartment in the cab, said seat compartment being located between the pair of engine assemblies and extending to a point adjacent the rear portions of said hinged panel member.

13. In a cab for a vehicle comprising a pair of engines, a cab mounted on the vehicle and provided with a passage-way extending between said pair of engines, said passage-way having portions extending over portions of said engines.

14. In a cab for a vehicle comprising a pair of engines, the combination of a door in the cab, a driver's compartment in the cab and having its floor located on a different level than the bottom of said door, and an inclined floor portion located at the longitudinal center of the vehicle and the cab and extending between said pair of engines and connecting the different levels of said door and said driver's compartment.

HUGH JOSEPH DILLON.